United States Patent [19]

Jenny

[11] Patent Number: 4,702,075
[45] Date of Patent: Oct. 27, 1987

[54] PROCESS AND DEVICE FOR OPERATING A DIESEL ENGINE WITH AN EXHAUST-GAS PARTICLE FILTER

[75] Inventor: Ernst Jenny, Baden, Switzerland

[73] Assignee: BBC Brown, Boveri & Company, Limited, Baden, Switzerland

[21] Appl. No.: 792,822

[22] Filed: Oct. 30, 1985

[30] Foreign Application Priority Data

Nov. 9, 1984 [CH] Switzerland .......................... 5387/84

[51] Int. Cl.[4] .......................... F01N 3/02; F02B 33/00
[52] U.S. Cl. ...................................... 60/274; 60/288; 60/311; 123/559.2
[58] Field of Search .................. 60/288, 311, 274, 280; 123/559 A

[56] References Cited

U.S. PATENT DOCUMENTS

| | | | |
|---|---|---|---|
| 3,361,350 | 1/1968 | Genbauffe | 60/288 |
| 3,937,015 | 2/1976 | Akado | 60/288 |
| 4,510,749 | 4/1985 | Taguchi | 60/288 |
| 4,538,412 | 9/1985 | Oishi | 60/288 |
| 4,553,387 | 11/1985 | Mayer | 60/285 |
| 4,561,407 | 12/1985 | Jaussi | 60/602 |

FOREIGN PATENT DOCUMENTS

| | | | |
|---|---|---|---|
| 3235953 | 3/1984 | Fed. Rep. of Germany | 60/275 |
| 2538449 | 6/1984 | France . | |
| 2007529 | 5/1979 | United Kingdom . | |

Primary Examiner—Douglas Hart
Attorney, Agent, or Firm—Burns, Doane, Swecker & Mathis

[57] ABSTRACT

A method and apparatus wherein a diesel having an exhaust-gas passage, a particle filter at a location along the exhaust-gas passage and a bypass passage bypassing the particle filter is started with the bypass passage closed, is operated at idle and up to a predetermined partial load with the bypass passage open and is operated beyond the partial load with the bypass passage closed so as to reduce particulate emissions and to assure regeneration of the particle filter.

4 Claims, 3 Drawing Figures

PROCESS AND DEVICE FOR OPERATING A DIESEL ENGINE WITH AN EXHAUST-GAS PARTICLE FILTER

FIELD OF THE INVENTION

The invention relates to a process for operating a diesel engine which has on the exhaust-gas side a particle filter through which the flow passes at least under full load, at least some of the exhaust gases being guided round the particle filter via a bypass in specific operating ranges. It also relates to a device for carrying out the process.

BACKGROUND OF THE INVENTION

The invention is suitable for suction engines and for supercharged engines. Thus, as regards supercharged internal-combustion engines, it is already known, for example from EP-A-0,072,059, to arrange an exhaust-gas particle filter in the high-pressure part of the exhaust-gas system in front of a gas-dynamic pressure-wave machine. If clogging of the exhaust-gas particle filter occurs under partial load, its pressure loss presents an obstacle to gas exchanges within the engine system, thus resulting in a reduction in effective power. The vehicle driver usually compensates the performance loss by supplying a greater amount of fuel. When the vehicle driver demands sufficient power from the vehicle, the exhaust-gas temperature rises sharply and the exhaust-gas particles deposited in the filter are burnt off automatically.

Where passenger vehicles are concerned most trips are usually made under low-load conditions, and in this case it is expedient to ensure that there is sufficient burn-off in the fairly rare high-load periods. Drivers who demand very little power from the vehicle must be borne in mind here.

In addition, the reaction, that is to say the regeneration of the filter, does not take place immediately. The burn-off rate depends very greatly on the temperature of the particles, on the oxygen concentration in the exhaust gas and on the quantity of particles present. The burn-off rate can be increased by means of catalytic coating of the exhaust gas particle filter and by means of additives in the fuel.

Operating phases with a high engine load usually follow those with a low load. Such conditions arise when the vehicle accelerates after stopping at a traffic light or reaccelerates after a deceleration phase in the traffic flow. In the low-load phase, the exhaust gases cool the particle filter and the particles to below 200° C. Although the after-cylinder exhaust-gas temperature increases very rapidly to above 500° C. during acceleration, nevertheless the filter material and soot particles must first be heated to a temperature at which burn-off can take place quickly enough. This typically lasts approximately ten seconds. After this time, the accelerator is frequently already released again. This shows how difficult it is to ensure that the exhaust-gas particle filters are not unduly clogged in any driving conditions.

There is also the danger, here, that the exhaust-gas particle filter will become very heavily laden in which case the filter may de damaged as a result of an overintensive burn-off in a rare but relatively long high-load phase. It is therefore necessary to find systems in which the exhaust-gas particle filters burn off as frequently as possible and never become too heavily laden. This also reduces the attendant pressure drop in the exhaust-gas particle filter.

In engines with supercharging units operated with exhaust gas, in which the exhaust-gas particle filter is connected between the engine outlet and gas inlet of the supercharging unit, there is a further problem in that the acceleration behaviour is inadequate. This is explained as follows: although, as mentioned above, the after-cylinder exhaust-gas temperature jumps immediately to above 500° C. during acceleration, nevertheless the exhaust gases are first cooled to values of around 200° C. in front of the supercharging unit because of the large cold mass of the exhaust-gas particle filter. When the temperature is so low, the enthalpy gradient which can be utilized is only slight and the supercharging effect likewise remains slight. In this case, the engine does not deliver much more power than if it were not supercharged, and because of this supercharging is pointless.

This leads at once to the idea of increasing the back-pressure in the exhaust by reducing the throughflow crosssection of the supercharging unit. However, in exhaust-gas turbo-suprchargers with a fixed turbine cross-section, this is impossible in practice, if acceptable levels of efficiency are to be achieved during normal operation. In turbo-superchargers with a variable turbine geometry and in gas-dynamic pressure-wave machines, the absorption capacity can be reduced. However, the counterpressure in the exhaust rises to around one bar above the supercharging pressure. The effective mean pressure of the engine process is lowered by this amount, and the improvement in driving performance is limited, quite apart from the associated disadvantage with regards to consumption.

The exhaust-gas particle filter between the engine outlet and the gas inlet of the supercharger thus presents a serious problem in terms of acceleration. Arranging the exhaust-gas particle filter after the supercharger has hitherto been unsuccessful, because the temperatures are lower there and there is no reliable burn-off.

The acceleration power can be improved somewhat by over-fuelling. This means that the injection rate is set higher than is normally permissible because of the generation of soot. The soot which arises is mostly trapped in the exhaust-gas particle filter. However, this measure is limited, since the exhasut-gas particle filter otherwise becomes contaminated too quickly. There is therefore the additional requirement that the supercharger should deliver supercharging pressure rapidly and allow a further increase in the mean pressure of the engine, without an extremely low air excess. To achieve this, the exhaust-gas temperature in front of the supercharger must rise to 300° to 400° C. in approximately one second. A supercharging pressure ratio of 1.5 can be obtained in this way.

A process and a device of the type mentioned in the introduction were presented at a symposium on motor-vehicle diesel engines held on Oct. 3rd to 4th, 1983 at the Wuppertal Technical Academy in Germany. The measure adopted to reduce the requirement for secondary energy, necessary to start regeneration and carry out regeneration, is the bypass circuit. This has to be regulated as a function of the load and speed in the characteristic diagram. In this respect it has been stated that, in a specific power range of a supercharged engine, some of the exhaust gases, for example half, could be guided directly in front of the supercharger by the bypass at least during the acceleration phase. The desired mixing temperature of 300° to 400° C. is then obtained immediately there. The bypass must open one to two bars below the mean pressure which can be reached in non-supercharged running. Under normal operating conditions, for example in the U.S.-City cycle, a passenger car drives above this limit only a small percentage of the time. However, more soot is generated under a high load. Nevertheless, only a fraction of the soot is generated above the said limit. Even if some of it is not filtered, nevertheless, over all, the statutory value can be achieved. The extremely strict regulations in California could be an exception to this.

If the vehicle operates partly under bypass conditions in the acceleration phase, the disadvantage of this is that in the very period in which, according to experience, diesel engines produce the most smoke, some of the exhaust gases are not filtered. The possibility of slight over-fuelling during acceleration is forestalled.

OBJECT AND SUMMARY OF INVENTION

The invention has the object of providing a process and a device, in which the particle emission is limited to 0.2 g/mile in an economical way both in supercharged engines and in suction engines.

This and other objects are achieved by the present invention wherein a diesel having an exhaust-gas passage, a particle filter at a location along the exhaust-gas passage and a bypass passage bypassing the particle filter is started with the bypass passage closed, is operated at idle and up to a predetermined partial load with the bypass passage open and is operated beyond the partial load with the bypass passage closed so as to reduce particulate emissions and to assure regeneration of the particle filter.

The new operating process has the following advantages:

the gases are filtered during starting and under a high load, that is to say in those periods in which disturbing smoke and smells are particularly intense;

certain over-fuelling during acceleration is permissible, since the soot is trapped in the particle filter;

during a large part of the driving cycle and in daily driving, the counterpressure, at a low $p_{me}$ at which it has a particularly high effect, is low, with the result that consumption improves;

apart from during initial starting, the particle filter, through which the flow passes only at a relatively high load, is always hot and therefore burns off more quickly;

where superchargers operated with exhaust gas are concerned, an acceptable acceleration is achieved since the particle filter is not cooled to below 300° C.

The advantages of the new device are as follows:

solely as a result of rheological measure, it is possible, if appropriate, even to do without a further shut-off flap for the particle filter;

if the quantity of gas flowing through the bypass is supplied to a gas-dynamic pressure-wave machine with increased spin, the self-drive of the pressure-wave machine rotor under a low load can be assisted by the present invention.

BRIEF DESCRIPTION OF THE DRAWING

The drawing illustrates diagrammatically two exemplary embodiments of the invention, with reference to a diesel engine supercharged by a gas-dynamic pressure-wave machine. In the drawing.

In FIGS. 1 and 3, in which the same parts are each provided with the same reference symbols despite a partly differing representation, and in which the flow direction of the media is denoted by arrows, a six-cylinder diesel engine 1 is connected on the air side to a gas-dynamic pressure-wave machine 10 via a supercharging-air line 2. This pressure-wave machine, explained in more detail later in connection with exhaust-gas recirculation, is provided on the low-pressure side with an intake line 7 for fresh air. The engine exhaust gases pass via an exhaust-gas manifold 3 into the pressure-wave machine 10, from which, after giving off their energy, they are ejected into the atmosphere via an exhaust 8.

Figure 1:
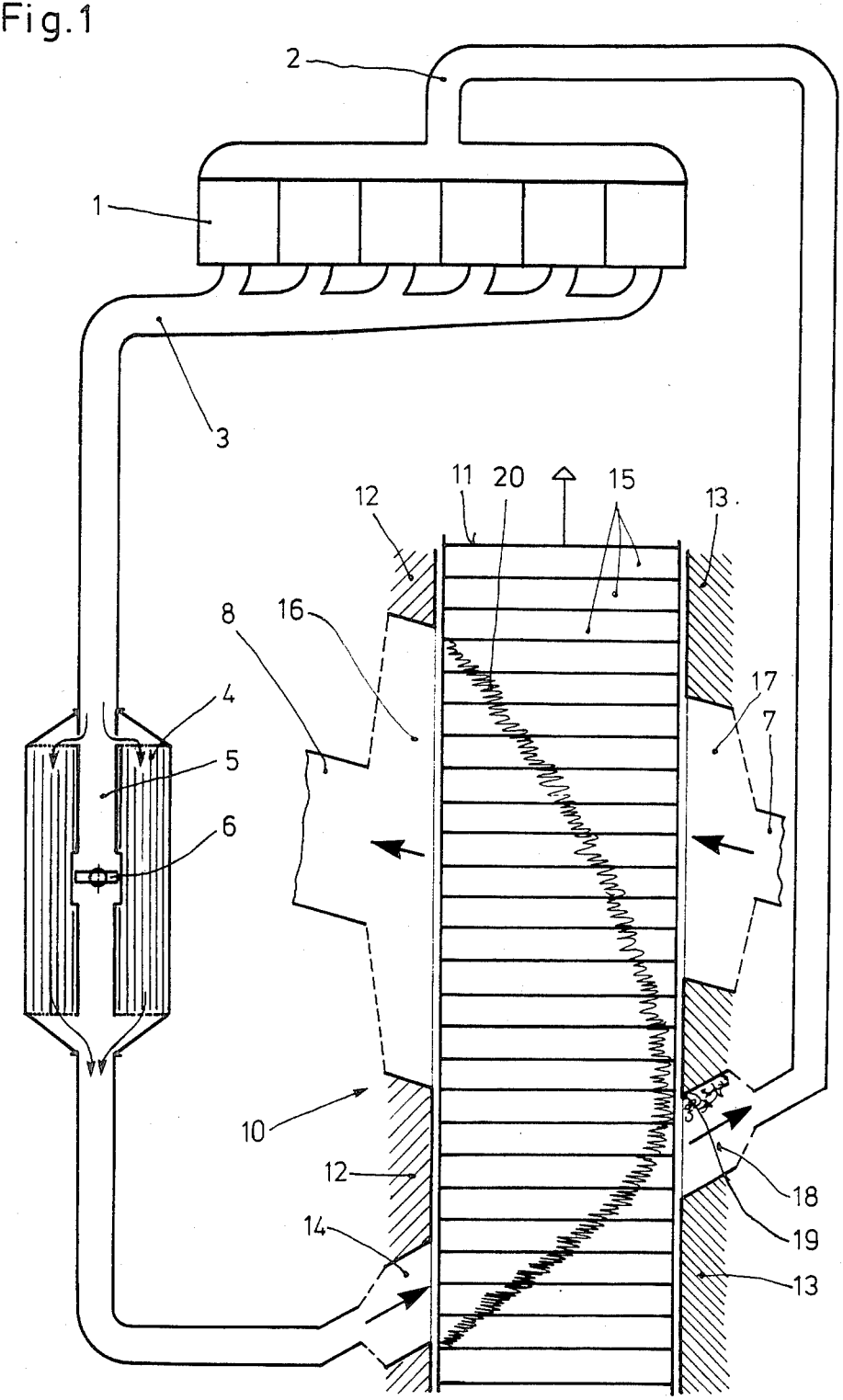
FIG. 1 is a diagram of an engine with an exhaust system a bypass passage integrated in a particle filter in accordance with a preferred embodiment of the present invention.

For exhaust-gas retreatment, the particle filter 4 is arranged in the manifold. This can be a non-coated ceramic filter or ceramic filter coated with precious metal or else a catalytically coated cloth or foam filter. In an integrated design, the filter has a bypass 5 in which a shut-off flap 6 is arranged.

According to the invention, under low engine loads no flow will pass through the operative part of the filter 4, to prevent sharp cooling. The selected configuration with integrated bypass 5 satisfies this condition sufficiently, because, when the bypass is fully open hardly any exhaust gas at all will pass through the porous walls of the filter, particularly when the filter is constructed from a ceramic material. There is therefore no need for a second flap to shut off the filter.

The invention functions as follows:

When the engine starts, the shut-off flap 6 in the bypass 5 is closed and all the exhaust gases flow through the active part of the filter 4. From idling up to a predetermined partial load, the flap 6 is fully open, so that the exhaust gases which are not very hot flow through the bypass without subjecting the filter material to any stress. Beyond the predetermined part load, the shut-off flap 6 is closed, indeed completely, so that the now hot gases flow through the filter and ignite the soot deposited in it. As a result of the exothermal reaction of the soot particles in the filter, the latter heats up, and regeneration is thereby maintained and carried out automatically.

The partial load at which the shut-off flap must be actuated so as to close it is preferably in an effective mean pressure ($p_{me}$) range of between approximately one and three bars. The actual change-over from bypass operation to filter operation will not occur abruptly, since this can result in a disagreeable driving behaviour. In particular, the pressure drop in the particle filter increases the energy required for the chargecycle corresponds to a decrease in the mean effective pressure $p_{me}$ which is noticeable to a greater or lesser extent according to the laden state of the filter. Preferably, the filter must be cut in continuously in a range between $p_{me}$ of one and two bars. During acceleration, this is then expressed in a continuous increase in power.

The shut-off flap 6 can be controlled in a simple way (not shown) from the control rod (accelerator pedal) or via the exhaust-gas temperature. Other typical process parameters or engine parameters can also be used for this purpose.

The effect of the invention is described below with reference to a numerical example with reference to the graph in FIG. 2. It is to be understood that the numbers given may only be approximate values, because there are many parameters, such as, for example, the engine type, direct injection or chamber engine, which can influence the particle emission and therefore the configuration and mode of operation of the engine/filter/-bypass system. The influence of the engine speed is also not taken into account for the sake of simplification.

The mean indicated pressure $p_{mi}$ and the associated mean effective pressure $p_{me}$ in bars are plotted on the abcissa. The latter is obtained according to the equation $p_{me}=p_{mi}-p_R - \Delta p_{PF}$, in which $p_R$ represents the frictional pressure and $\Delta p_{PF}$ represents the pressure drop in the cut-in filter.

On the ordinate, the exhaust-gas temperature T in odegrees celsius is plotted at the top, the bypass area open at any particular time F in per cent is plotted at the middle and the retention time t in per cent in the U.S.-City cycle is plotted at the bottom according to high-power operation P, braking operation B and idling L.

On the assumption that the generation of soot depends not only on time, but also on the load, and that at a high $p_{me}$ more fuel is injected and the particle quantity thus tends to increase, it is possible to state approximately that the engine can run under bypass conditions in the lower $p_{me}$ range, that is to say for approximately 40% of the time. Yet at the same time it is certain that more than half the total soot is filtered out when the filter is in operation. Consequently, on good diesel engines the particle emission definitely falls below the limit of 0.2 g/mile.

The time integral in which the engine can be operated under bypass conditions is represented by dots in the bottom part of the diagram, and that in which the engine can be operated under filter conditions is represented by hatching.

The middle part of the diagram makes it clear that in the intended cut-in range of the filter, that is to say with $p_{me}$ at between one and two bars, the shutoff flap is controlled so that the bypass area decreases constantly and consequently the flow through the filter also increases constantly.

The curve T1 in the top part of the diagram corresponds to the typical curve of the exhaust-gas temperature of a normally supercharged diesel engine. It can be seen that, at the proposed change-over point b1, only a temperature of approximately 200° C. prevails. Consequently, the acceleration problem cannot be solved satisfactorily on supercharged engines. Nevertheless, it is already a considerable advance, since without this particular measure the start of acceleration after a deceleration period would have to occur as early as point a, that is to say at a very low temperature. It is also evident that the critical temperature $T_A$ of approximately 450° C., at which current catalytically coated particle filters burn off, is achieved only at a mean effective pressure of between five and six bars. When transferred to the bottom part of the diagram, this produces the relatively modest cross-hatched time integral. Whether this is sufficient for a reliable burn-off is questionable.

This is remedied by raising the exhaust-gas temperature by means of measures known per se, such as hot cooling, throttling of the supercharging air, later fuel injection or exhaust-gas recirculation. The latter is particularly advantageous because the fuel consumption is not substantially imparied thereby and this measure is usually necessary in any case to reduce the $NO_X$ emission.

This may be explained in more detail by reference to the example of exhaust-gas recirculation where a pressure-wave machine is used as a supercharging unit:

The basic design of such a pressure-wave machine and its precise structure can be taken from the applicant's publication CH-T 123,143 or Swiss Patent Specification No. 378,595. In FIG. 1, the pressure-wave machine 10 is shown is an enlarged view of a cylindrical section taken at half the height of the cells through the rotor and through the adjoining portions of the side parts of the housing. For the sake of simplicity, it is shown as a single-cycle pressure-wave machine, this being expressed by the fact that the gas housing 12 and the air housing 13 are each provided, on their sides facing the rotor 11, with only one high-pressure and one low-pressure orifice. To explain the function of the system more clearly, here again the flow directions of the working media and the direction of arrows.

The hot exhaust gases of the diesel engine 1 penetrate through the high-pressure gas inflow channel 14 into the rotor 11 provided with axially straight cells 15 open on both sides, expand in the rotor 11 and leave it via the low-pressure gas flow-off channel 16 into the exhaust 8. On the air side, atmospheric fresh air is sucked in through the intake line 7, flows axially via the low-pressure air inflow channel 17 into the rotor 11, is compressed in the latter and leaves it as supercharging air via the high-pressure air outflow channel 18 through the supercharging-air line 2 to the engine 1.

For an understanding of the actual gas-dynamic pressure-wave process which is extremely complex and which is not the subject of the invention, attention is drawn to the publication CH-T 123,143 already mentioned. The process cycle necessary to understand the invention is explained briefly below: the cell strip consisting of the cells 15 is a development of a cylindrical section of the rotor 11 which, when the latter rotates, moves upwards in the direction of the arrow. The pressure-wave processes take place inside the rotor 11 and ensure essentially that a gas-filled space and an air-filled space are formed. In the former, the exhaust gas expands and then escapes into the low-pressure gas flow-off channel 16, whilst in the latter some of the fresh air sucked in is compressed and ejected into the high-pressure air outflow channel 18. The remaining fraction of fresh air is flushed over into the low-pressure gas flow-off channel 16 by the rotor and consequently causes the complete outflow of the exhaust gases. This flushing is essential for the process cycle and must be maintained under all circumstances. As a rule, exhaust gas should be prevented from remaining in the rotor 11 and being supplied to the engine together with the supercharging air in a subsequent cycle.

However, depending on the pressure-wave machine design and operating conditions, a specific quantity of exhaust gas can be recirculated, this being even necessary for reasons of environmental protection or, as in the present case, desirable, To achieve this, a certain gas fraction passes over onto the air side and in the region of the closing edge 19 is flushed over into the high-pressure outflow channel 18. In the basic diagram, this is represented by the separating front 20 between the air and gas. This separating front is not a sharp limit, but rather a relatively wide mixing zone.

The supercharging air heavily contaminated with exhaust gas in this way causes the desired increase in the supercharging-air temperature and consequently the exhaust-gas temperature. Recirculation can, of course, also be achieved by means of the external devices which are customary today.

Figure 2:
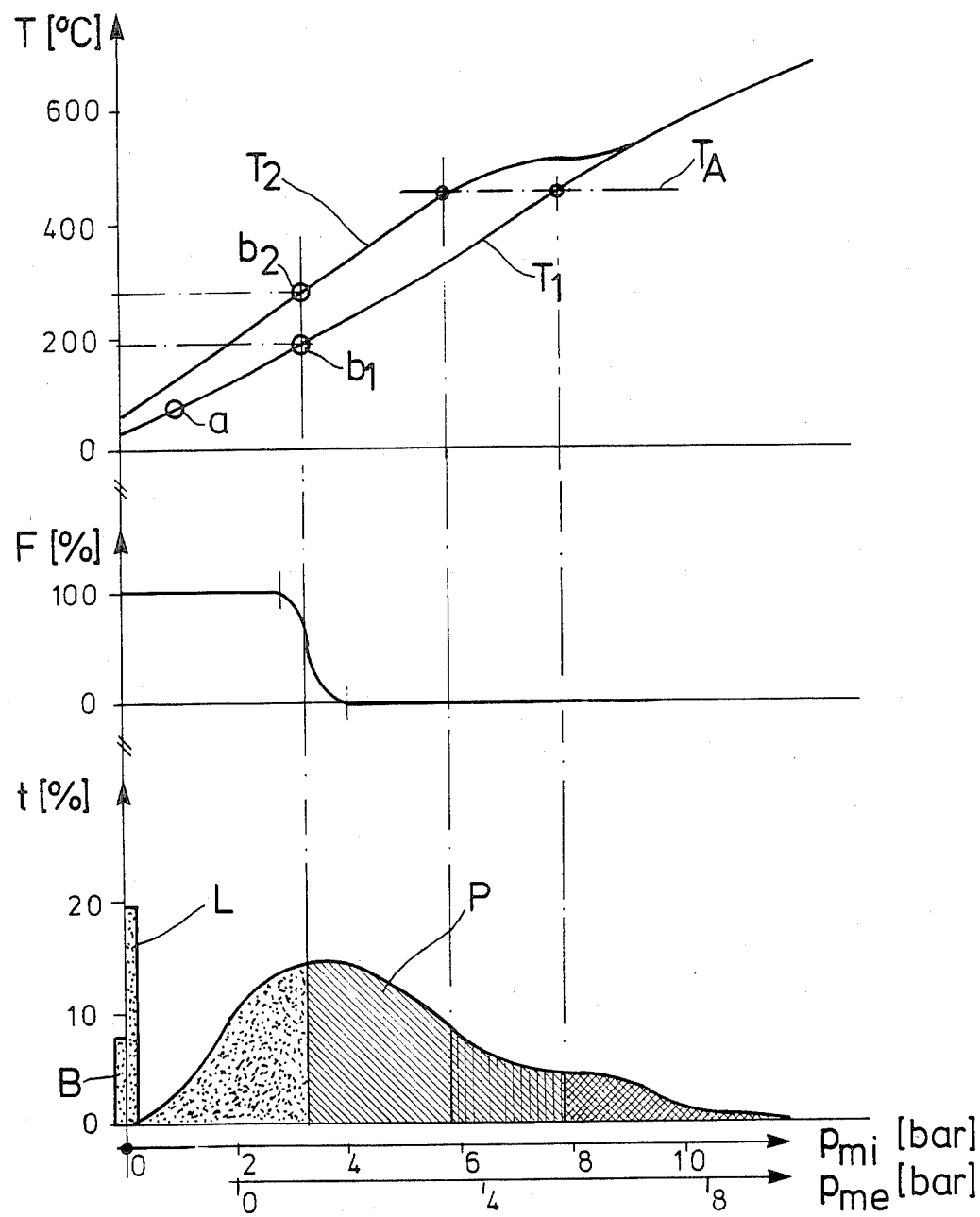
FIG. 2 is a graphical representation of the exhaust-gas temperature, bypass area and retention time in the U.S.-City cycle as functions of the indicated and effective mean pressures, respectively.
Figure 3:
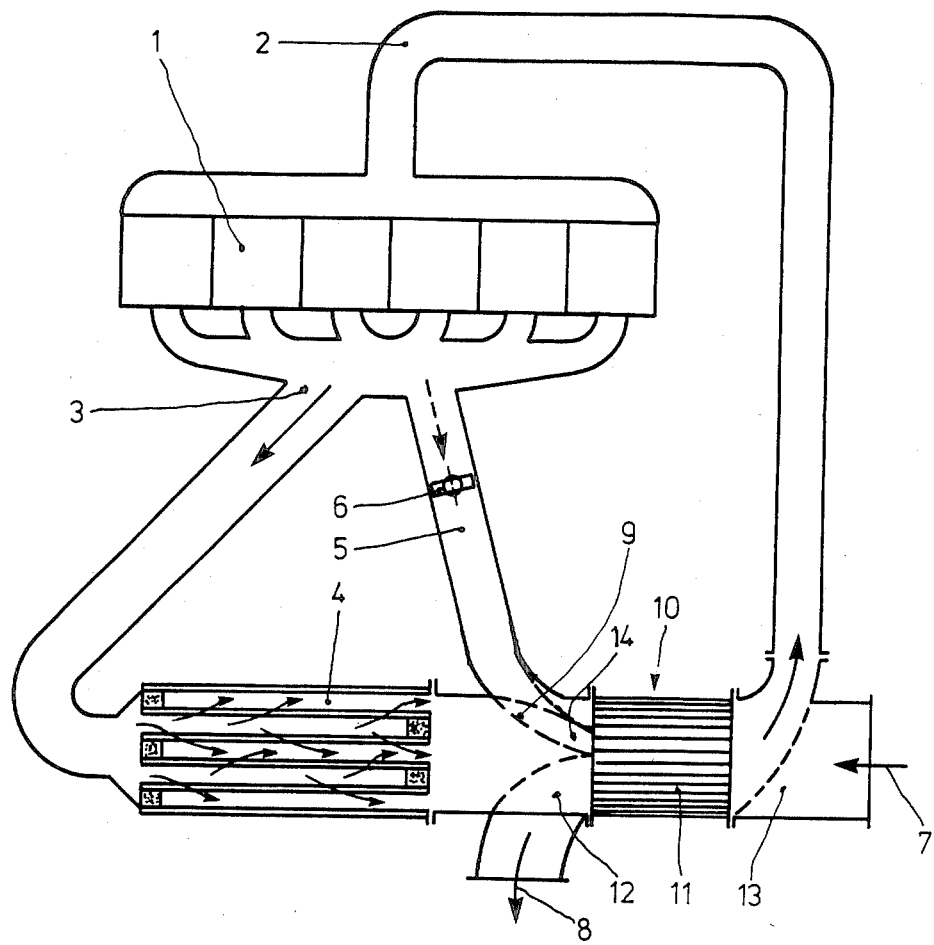
FIG. 3 is a diagram of a second preferred embodiment of the present invention having a separate bypass and an increase in the spin of the exhaust-gas stream.

This increased exhaust-gas temperature corresponds to the curve $T_2$ in FIG. 2. At the proposed changeover point, this ensures that only gases which are at approximately 300° according to point b2 flow through the particle filter. Also, the burn-off temperature $T_A$ of approximately 450° C. is already reached at a mean effective pressure of less than four bars. When transferred to the bottom part of the diagram, this produces in the cycle the cross-hatched time integral plus the diagonally and vertically hatched time integral, during which reliable burn-off occurs.

If a diesel engine emitting 0.3 g of soot per mile without a soot filter is assumed, the invention has the following effect. During the bypass period, approximately one third of this quantity of soot, that is to say 0.1 g, is produced and is ejected unfiltered into the atmosphere. The other two thirds, that is to say 0.2 g/mile, pass through the particle filter. If this has an efficiency of 75%, that is to say it allows one quarter of the quantity of soot to pass through unfiltered, a further 0.2 times one quarter=0.05 g/mile is conveyed into the atmosphere. Together, this amounts to $1+0.05=0.15$ g/mile, so that the engine runs reliably below the desired limmit of 0.2 g mile. It is evident that the change-over point can be selected the higher, the better the engine already is without a filter. This results in a corresponding saving in terms of consumption and a better accelerating capacity.

Increasing the exhaust-gas temperature by exhaust-gas recirculation can, of course, also be carried out on non-supercharged engines and when an exhaustgas turbo-supercharger or a mechanical supercharger is used. Since recirculation usually takes place here through a controlled line from the exhaust to the air side, it is appropriate to combine the function of the recirculation flap, necessary in this case, with that of the shut-off flap in the bypass.

FIG. 2 shows an alternative form in which the bypass 5 bypassing the filter 4 opens directly into the high-pressure gas inflow channel 14 of the pressure-wave machine 10. The direct short connection between the engine outlet and supercharger inlet is indicated diagrammatically here for the bypass as a flow measure which makes it unnecessary to provide an additional flap for shutting off the filter. This connection has much less flow resistance than the ceramic filter 4 illustrated, since there is a forced flow through the porous walls of the latter. Spin-generating means 9 are arranged in a bypass 5 downstream of the shut-off flap 6. These are, for example, the by-pass walls themselves which are curved in such a way that the spin of the gas stream conveyed out of the bypass is increased. During bypass operation, that is to say under low loads, this measure assists the self-drive of the rotor 11 of the pressure-wave machine.

In summary, because of the accelerating power, the new solution is not only advantageous, but necessary for engines with exhaust-gas superchargers; however, because of the favourable fuel consumption which can be achieved with it, it is also suitable for non-supercharged and mechanically supercharged diesel engines.

It is to be understood that the present invention may be embodied in other specific forms without departing from the spirit or essential characteristics of the present invention. The preferred embodiments are therefore to be considered illustrative and not restrictive. The scope of the inventiion is indicated by the appended claims rather than by the foregoing descriptions and all changes or variations which fall within the meaning and range of the claims are therefore intended to be embraced therein.

What is claimed is:

1. A method of operating a diesel engine of the type having an exhaust-gas passage connected to a gas-dynamic pressure-wave machine, a particle filter at a location along said exhaust-gas passage and a bypass passage bypassing said particle filter, said method comprising the steps of:

starting the engine with the bypass passage closed so that substantially all exhaust gases are conveyed through the particle filter;

operating the engine in the range of idle and up to a predetermined partial load with the bypass passage opened so that substantially all exhaust gases are conveyed through the bypass passage and delivered to the pressure wave machine in an unfiltered condition;

operating the engine beyond the predetermined partial load with the bypass closed constantly and completely so that substantially all exhaust gases are delivered to the pressure wave machine in a filtered condition; and elevating the temperature of exhaust gases passing through the exhaust-gas passage during said operating steps by recirculating a portion of the exhaust gases through the engine by means of the pressure wave machine.

2. The method as claimed in claim 1, wherein the predetermined partial load is selected in an operating range of the engine which corresponds to a mean effective pressure of between one and three bars of pressure.

3. The method as claimed in claim 1, further comprising a step of at least partially driving the pressure-wave machine at engine operating conditions below said predetermined load by delivering exhaust gases from the bypass passage to the pressure-wave machine and simultaneously generating spin exhaust gases delivered to said gas-dynamic pressure wave machine from said bypass passage.

4. A diesel engine in combination with a gas-dynamic pressure-wave machine comprising: an exhaust-gas passage, a particle filter at a location along said exhaust-gas passage, a bypass passage bypassing said particle filter and a shut-off valve at a location along said bypass passage, said bypass passage including a conduit connected with a port of said gas-dynamic pressure-wave machine, said conduit provided with means for generating spin in exhaust gases being delivered to said gas-dynamic pressure-wave machine.

* * * * *